United States Patent
Lee et al.

(10) Patent No.: US 7,372,838 B2
(45) Date of Patent: May 13, 2008

(54) GPRS (GENERAL PACKET RADIO SERVICE) SYSTEM WITH MULTIPLE GGSNS (GATEWAY GPRS SUPPORTING NODES) AND METHOD FOR SELECTING GGSN

(75) Inventors: Seung-Que Lee, Daejeon (KR); Nam-Hoon Park, Daejeon (KR); Dae-Sik Kim, Daejeon (KR); Choong-Ho Cho, Cheonan (KR)

(73) Assignee: Electronics and Telecommunications Research Institute, Daejon (KR)

( * ) Notice: Subject to any disclaimer, the term of this patent is extended or adjusted under 35 U.S.C. 154(b) by 905 days.

(21) Appl. No.: 10/438,114

(22) Filed: May 14, 2003

(65) Prior Publication Data
US 2004/0120296 A1  Jun. 24, 2004

(30) Foreign Application Priority Data
Dec. 23, 2002  (KR) ............. 10-2002-0082873

(51) Int. Cl.
*H04Q 7/24* (2006.01)
*H04L 12/28* (2006.01)
*H04L 12/56* (2006.01)

(52) U.S. Cl. ................... 370/338; 370/400
(58) Field of Classification Search ........... 370/338, 370/400, 401, 379; 455/432.1; 257/597
See application file for complete search history.

(56) References Cited
U.S. PATENT DOCUMENTS

| | | | |
|---|---|---|---|
| 6,295,450 B1 | 9/2001 | Lyer et al. | |
| 6,317,421 B1 | 11/2001 | Wilhelmsson et al. | |
| 6,748,434 B2 * | 6/2004 | Kavanagh | 709/224 |
| 2003/0055954 A1 * | 3/2003 | Kavanagh | 709/224 |
| 2003/0169712 A1 * | 9/2003 | Tsao | 370/338 |
| 2004/0032865 A1 * | 2/2004 | Kwon | 370/367 |
| 2004/0228347 A1 * | 11/2004 | Hurtta et al. | 370/395.2 |

FOREIGN PATENT DOCUMENTS

| | | |
|---|---|---|
| KR | 1020020052499 | 7/2002 |
| KR | 10-2003-0067089 | 8/2003 |
| WO | WO 02/37772 A1 | 5/2002 |

\* cited by examiner

*Primary Examiner*—Seema S. Rao
*Assistant Examiner*—Mon Cheri S Davenport
(74) *Attorney, Agent, or Firm*—Blakely, Sokoloff, Taylor & Zafman LLP

(57) ABSTRACT

A GPRS system having multiple GGSNs connected to a public network, for providing a packet-based mobile service, comprises: an SGSN for controlling a connection operation according to a session request of a mobile terminal for receiving the packet-based mobile service, and transmitting a packet according to a connected session; a multiple GGSN unit including a plurality of sub GGSNs, selected by the SGSN according to a session request by the mobile terminal, for transmitting and receiving packets; a DNS for storing DNS names and IP information in the GGSNs of the multiple GGSN unit according to selection of the SGSN; an operator network for managing the DNS and communication; and an edge router for performing packet routing between the GPRS system and the public network.

5 Claims, 5 Drawing Sheets

FIG.4

| Target | Next Hop(Gateway) | Interface(I/F) |
|---|---|---|
| IP address area A | IP address of GGSN1 | Operation network I/F |
| IP address area a | IP address of GGSN1 | Operation network I/F |
| IP address area B | IP address of GGSN2 | Operation network I/F |
| IP address area b | IP address of GGSN2 | Operation network I/F |
| IP address area C | IP address of GGSN3 | Operation network I/F |
| IP address area c | IP address of GGSN3 | Operation network I/F |
| ...... | ...... | ...... |
| IP address area D | IP address of GGSN4 | Operation network I/F |
| IP address area d | IP address of GGSN4 | Operation network I/F |
| ...... | ...... | ...... |

GPRS (GENERAL PACKET RADIO SERVICE) SYSTEM WITH MULTIPLE GGSNS (GATEWAY GPRS SUPPORTING NODES) AND METHOD FOR SELECTING GGSN

CROSS REFERENCE TO RELATED APPLICATION

This application is based on Korea Patent Application No. 2002-82873 filed on Dec. 23, 2002 in the Korean Intellectual Property Office, the content of which is incorporated herein by reference.

BACKGROUND OF THE INVENTION (a) Field of the Invention

The present invention relates to a GGSN (gateway GPRS supporting node) in a GPRS (general packet radio service) system. More specifically, the present invention relates to a GPRS system having multiple GGSNs and a method for selecting a GGSN for increasing system capability through distribution and enabling fluent management according to traffic variation.

(b) Description of the Related Art

A GPRS system is a packet-based radio communication service, which became available in 2000, guaranteeing mobile phone and computer users access to the Internet without interruption at the 56 through 114 Kbps data speeds.

Because of fast data transmission by the GPRS system, the users may take part in video conferences, and use a mobile device as well as a notebook computer to perform interactive communication with multimedia web sites.

The GGSN links an inner GPRS network of the GPRS system to a public network. All the packets transmitted by a mobile station are provided to the public network through the GGSN, and all the packets on the public network are transmitted to the mobile station through the GGSN.

Therefore, the GGSN functions as a gateway for performing routing between the inner network and the public network.

FIG. 1 shows a block diagram of a general GPRS system.

Referring to FIG. 1, the GPRS system comprises an SGSN (serving GPRS supporting node) 101, a GPRS network 102, a GGSN 103, an operator network 104, an FA (foreign agent) 105, a DNS (domain name system) 106, a DHCP (dynamic host configuration protocol) 107, an edge router 108, and a public network 109.

The SGSN 101 is session-connected to the GGSN 103 selected in response to a session request by a terminal so as to perform packet transmission in the connected session state.

The operator network 104 is provided between the GGSN 103 and the public network 104 so as to perform communication with subsidiary devices including the DNS, the DHCP 107, and the FA 105 in addition to the GGSN 103.

Also, the edge router 108 adjacent to the public network 109 is a final end of the GPRS system, it operates a routing protocol including the RIP (routing information protocol) and the BGP (border gateway protocol), and performs a security function in the like manner of a firewall or the IPSEC (Internet protocol security protocol.)

The next two points regarding the GGSN 103 in the GPRS system as shown in FIG. 1 need to be considered.

First, the GGSN 103 functions as a gateway between the public network 109 and the GPRS network 102. When a problem occurs in the GGSN, the GPRS system no longer provides any service, and in particular, users who employ static IPs (Internet protocols) cannot set sessions.

To solve the above-noted problem, the GGSN 103 is realized as fault-tolerant hardware and software, and a method for using both hardware and software is sometimes used. However, this method increases the cost of building GGSNs with respect to the standby mode, and wastes resources since the GGSN does not have a processing function in the standby mode.

Second, the GGSN 103 may also function as a packet router because it is a final end of GTP (GPRS tunneling protocol) messages tunneled by the GTP.

Therefore, general packets transmitted and received by application programs of a mobile station are provided within the GGSN 103, and the general packets are routed by an IP layer. Hence, the GGSN 103 has a performance problem that commercial routers on the Internet have.

To solve the problem, an efficient hardware and software structure is required so as to process traffic reached by the GGSN 103 without delays.

However, the traffic required from the GGSN 103 is not determined at the instant of arrangement, and the required traffic may be increased or decreased depending on the number of users on the public network 109. Therefore, the GGSN 103 needs flexible processing performance in preparation for traffic increase and decrease.

SUMMARY OF THE INVENTION

It is an object of the present invention to provide a GPRS system with multiple GGSNs and a GGSN selecting method for configuring multiple GGSNs in the GPRS system and processing a public network through a plurality of nodes rather than without processing the public network using a single node, thereby increasing system availability through distribution and fluently managing traffic increase and decrease.

In one aspect of the present invention, a GPRS (general packet radio service) system having multiple GGSNs (gateway GPRS supporting nodes,) connected to a public network, for providing a packet-based mobile service, comprises: an SGSN (serving GPRS supporting node) for controlling a connection operation according to a session request of a mobile terminal for receiving the packet-based mobile service, and transmitting a packet according to a connected session; a multiple GGSN unit including a plurality of sub GGSNs, selected by the SGSN according to a session request by the mobile terminal, for performing a gateway operation between the GPRS system and a public network so as to transmit and receive packets; a DNS (domain name system) for storing DNS names and IP (Internet protocol) information in the GGSNs of the multiple GGSN unit according to selection of the SGSN, and managing the same; an operator network connected between the multiple GGSN unit and the public network, for managing the DNS and communication; and an edge router provided at the final end point of the GPRS system, for performing packet routing between the GPRS system and the public network.

Each sub GGSN in the multiple GGSN unit manages address areas of a static IP and a dynamic IP.

The edge router has a routing information table according to address areas of a dynamic IP and a static IP allocated to the sub GGSN of the multiple GGSN unit, and uses the routing table to route the packet received from the public network to the corresponding sub GGSN.

In another aspect of the present invention, a method for selecting a GGSN (gateway GPRS supporting node) using a dynamic IP in a GPRS (general packet radio service) system including an SGSN (serving GPRS supporting node) for controlling a connection operation according to a session request of a mobile terminal for receiving the packet-based mobile service; a multiple GGSN unit including a plurality of sub GGSNs, selected by the SGSN according to a session request by the mobile terminal, for transmitting and receiving packets; and a DNS (domain name system) for storing DNS names and IP (Internet protocol) information in the GGSNs of the multiple GGSN unit according to selection of the SGSN, comprises: (a) the SGSN receiving a session connection request provided by the mobile terminal, and enquiring for a GGSN IP address using the DNS name; (b) the DNS checking that the GGSN IP address enquiry from the SGSN has been received by the DNS name, and notifying the SGSN of IP addresses of all the GGSNs having the corresponding DNS name; and (c) the SGSN randomly selecting one of the GGSNs from among the IP addresses of the GGSNs received from the DNS, and transmitting a session connection request message to connect a session, and providing a packet-based mobile service to the mobile terminal.

In still another aspect of the present invention, a method for selecting a GGSN (gateway GPRS supporting node) using a static IP in a GPRS (general packet radio service) system including an SGSN (serving GPRS supporting node) for controlling a connection operation according to a session request of a mobile terminal for receiving the packet-based mobile service; a multiple GGSN unit including a plurality of sub GGSNs, selected by the SGSN according to a session request by the mobile terminal, for transmitting and receiving packets; and a DNS (domain name system) for storing DNS names and IP (Internet protocol) information in the GGSNs of the multiple GGSN unit according to selection of the SGSN, comprises: (a) the SGSN receiving a session connection request from the mobile terminal, and enquiring for a GGSN IP address using the DNS name; (b) the DNS checking that the GGSN IP address enquiry from the SGSN has been received by the DNS name, and notifying the SGSN of IP addresses of all the GGSNs having the corresponding DNS name; (c) the SGSN randomly selecting one of the GGSNs from among the IP addresses of the GGSNs received from the DNS, and transmitting a session connection request message to stand by for receipt of a success response message; (d) the SGSN removing a corresponding GGSN, randomly selecting another GGSN, and transmitting a session connection request message to it to repeat (c) until the success response message is received, when the SGSN has not received the success response message; and (e) the SGSN connecting a session with the GGSN that has transmitted a success response message to the SGSN, and providing a packet-based mobile service.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4 shows a routing table of an edge router of FIG. 2 according to a preferred embodiment of the present invention;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
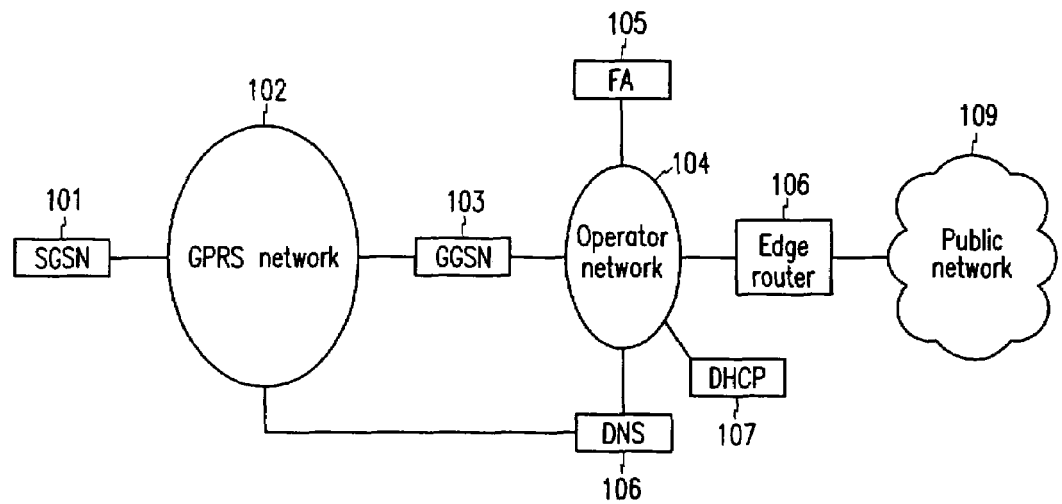
FIG. 1 shows a block diagram of a general GPRS system.
Figure 2:
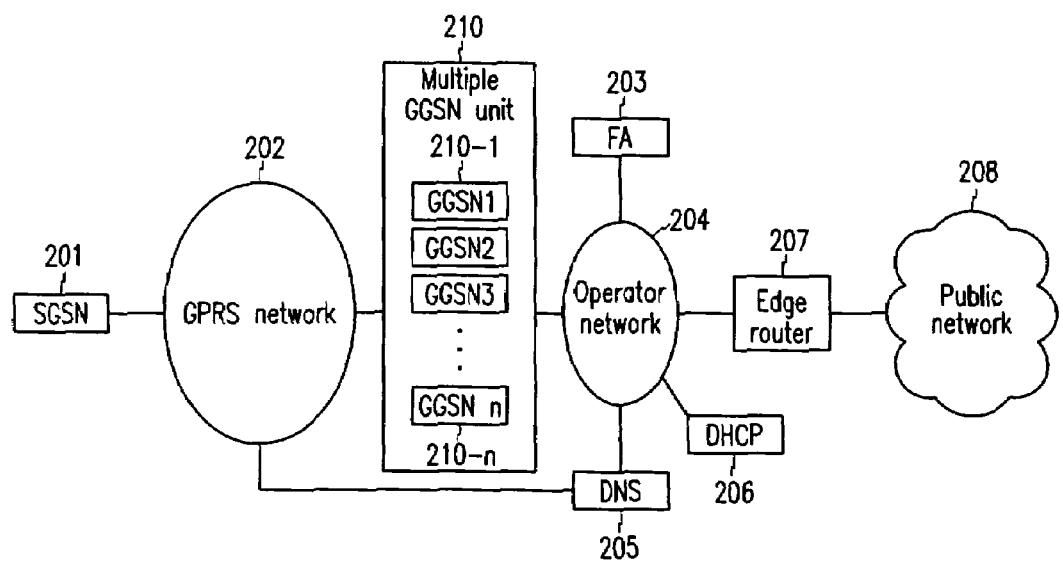
FIG. 2 shows a block diagram of a GPRS system having multiple GGSNs according to a preferred embodiment of the present invention.

FIG. 2 shows a block diagram of a GPRS system having multiple GGSNs according to a preferred embodiment of the present invention.

Referring to FIG. 2, the GPRS system comprises an SGSN 201, a GPRS network 202, a multiple GGSN unit 210, an FA 203, an operator network 204, a DNS 205, a DHCP 206, an edge router 207, and a public network 208.

The multiple GGSN unit 210 includes a plurality of sub-GGSNs 210-1 through 210-n, each of which performs an identical function.

The GGSNs 210-1 through 210-n are independently operated according to a load distribution concept, and when a first one of the nodes is down, another node performs the functions of the first node.

Also, a user considers the GGSNs 210-1 through 210-n as a single multiple GGSN unit 210, and he does not need to be aware that the multiple GGSN unit 210 includes a plurality of nodes.

By using the above-noted structure, when one of the nodes is malfunctioning, other nodes perform the GPRS system service, thereby preventing service interruption and increasing availability.

Further, since many nodes distribute routing to perform it, traffic increase and decrease is fluently managed by controlling the configuration of the GGSNs 210-1 through 210-n according to traffic volumes.

Job partition of the respective GSNs 210-1 through 210-n in the multiple GGSN unit 210 will now be described.

Figure 3:
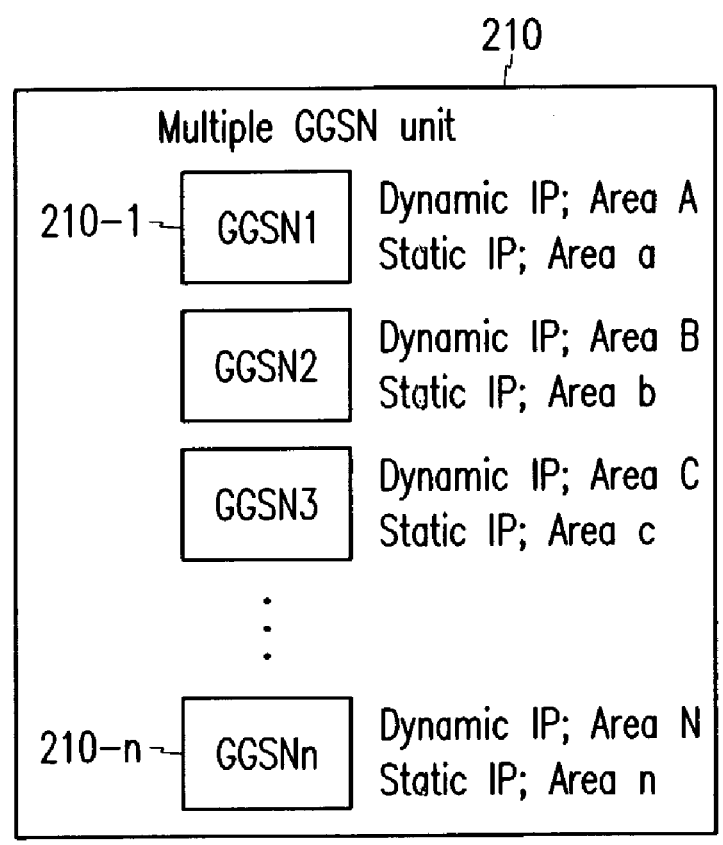
FIG. 3 shows a block diagram for a reference of job partition of the multiple GGSNs of FIG. 2 according to a preferred embodiment of the present invention.

FIG. 3 shows a block diagram for reference to job partition of the multiple GGSNs of FIG. 2 according to a preferred embodiment of the present invention.

Referring to FIG. 3, the GGSNs 210-1 through 210-n allocate a static IP or a dynamic IP according to a request by the user. When a mobile station is allocated an IP, the routing is performed on the corresponding IP by the allocated GGSNs 210-1 through 210-n until the corresponding session is terminated, and accordingly, the job partition of the respective GGSNs 210-1 through 210-n uses IP addresses.

Therefore, as shown in FIG. 3, when the dynamic IP has a range from an area A to an area N, and the static IP has a range from an area a to an area n in the multiple GGSN unit 210, the GGSN1 210-1 manages the areas A and a, and the GGSN2 210-2 manages the areas B and b, etc., thereby performing job partition.

When a mobile station requests a session setting, the respective GGSNs 210-1 through 210-n having the above-described job partition may allocate a static IP and a dynamic IP allocated to them, and packet routing is performed on the allocated IP until the session is finished.

An edge router in the GPRS system having multiple GGSNs according to the preferred embodiment of the present invention has a routing table for packet routing of the job-partitioned GGSNs 210-1 through 210-n.

FIG. 4 shows a routing table of the edge router 207 of FIG. 2 according to a preferred embodiment of the present invention.

Referring to FIG. 4, it is required for the edge router 207 to set and store a routing table so as to select respective GGSNs 210-1 through 210-n when transmitting the packets provided through the public network 208 (e.g., the Internet) to the multiple GGSN unit 210.

Therefore, since the GGSN1 201-1 manages the IP address areas A and a as shown in FIG. 4, the edge router 207 sets a next hop to go to the GGSN1 210-1 so as to send a packet to the GGSN1 210-1.

In the like manner of the above-noted method, the edge router 207 sets a next hop so that the packet having an IP address of an area managed by the respective GGSNs 210-1 through 210-n may be routed to the corresponding GGSNs 210-1 through 210-n.

In this instance, since it is required for the edge router 207 to pass through the operator network 204 so as to interface with the GGSNs 210-1 through 210-n, the edge router 207 sets interface information of the routing table through an operator network interface.

Also, entries of the routing table are propagated to public routers according to a routing protocol such as the RIP and the BGP.

A method for selecting multiple GGSNs in the GPRS system will now be described.

Figure 5:
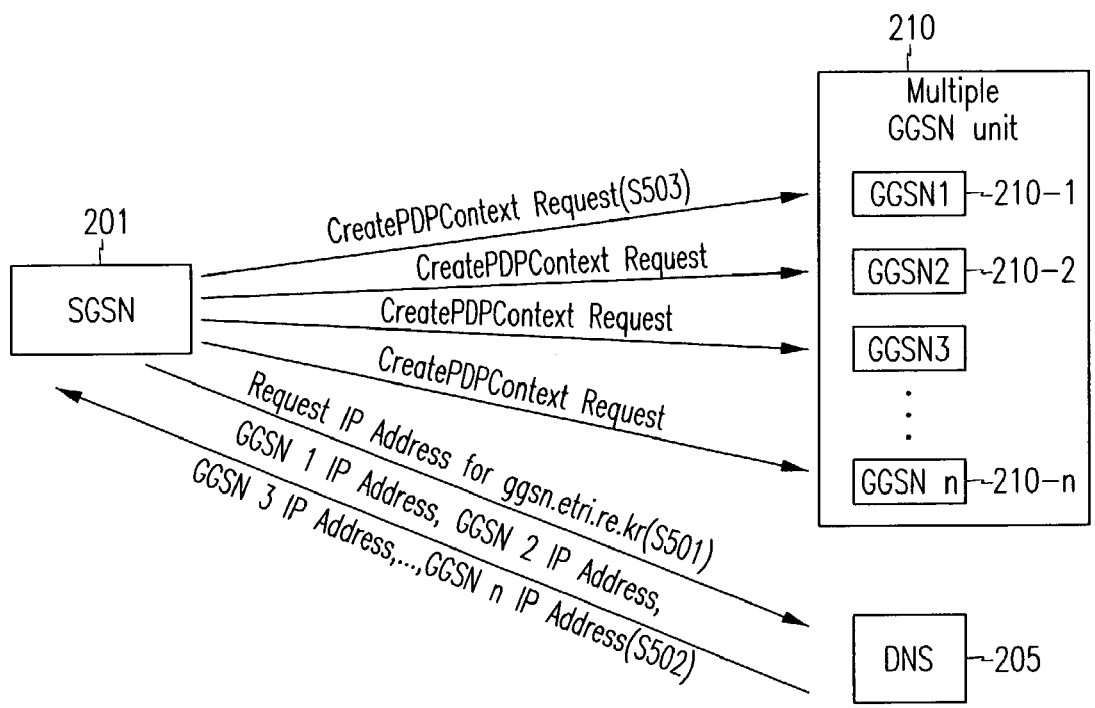
FIG. 5 shows a process block diagram of a method for selecting the multiple GGSNs of a GPRS system using a dynamic IP according to a preferred embodiment of the present invention.

FIG. 5 shows a process block diagram of a method for selecting the multiple GGSNs of a GPRS system using a dynamic IP according to a preferred embodiment of the present invention.

Referring to FIG. 5, the GGSNs 210-1 through 210-n selected by the SGSN 201 through the APN (access point name) rule are given DNS name formats.

Hence, the SGSN 201 uses the DNS names to request an IP address from the DNS 205 in step S501, and when the DNS name is set to be ggsn.etri.re.kr, the DNS 205 is previously required to be bound to an IP address of the GGSN1 210-1 through an IP address of the GGSNn 210-n of ggsn.etri.re.kr.

The DNS 205 responds to all IP addresses matched with ggsn.etri.re.kr in step S502, and the SGSN 201 randomly selects one of the IP addresses and sends a session request in step S503.

In this instance, the random selection of one of the GGSNs 210-1 through 210-n generates no problems even in the case of receiving an IP from a predetermined node and setting a session according to features of a dynamic IP.

A method for setting the GGSNs 210-1 through 210-n is differently applied to the case of a session using a static IP.

Figure 6:
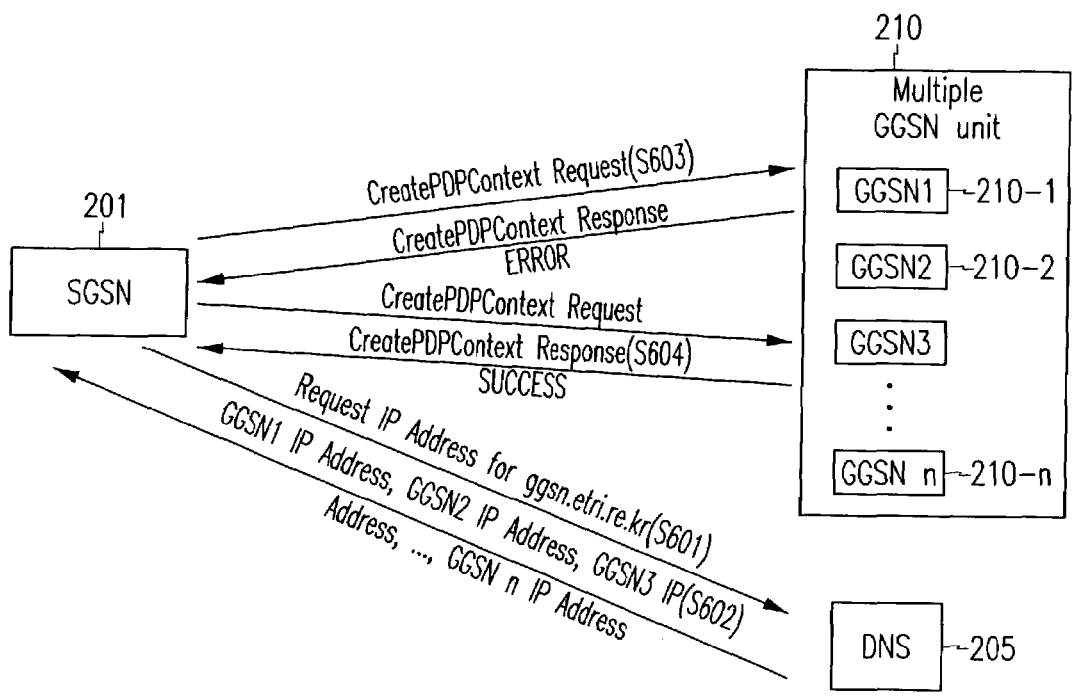
FIG. 6 shows a process block diagram of a method for selecting the multiple GGSNs of a GPRS system using a static IP according to a preferred embodiment of the present invention.

FIG. 6 shows a process block diagram of a method for selecting the multiple GGSNs of a GPRS system using a static IP according to a preferred embodiment of the present invention.

Referring to FIG. 6, the GGSNs 210-1 through 210-n selected by the SGSN 201 through the APN rule are given DNS name formats in the like manner of the dynamic IP.

The SGSN 201 requests an IP address of the GGSNs having a predetermined DNS name from the DNS 205 in step S601, and the DNS 205 notifies the SGSN 201 of all the IP addresses of the GGSNs having the corresponding DNS name in step S602.

The SGSN 201 randomly selects GGSNs from among a plurality of nodes to send a session setting request message.

For example, when the SGSN 201 randomly selects the GGSN1 210-1 and transmits a session connection request message in step S603, the GGSN1 210-1 determines whether the static IP that requires the corresponding session is an IP address in the area that may be processed by the GGSN1 210-1, and when the GGSN1 cannot process the static IP, the GGSN1 processes it as an error.

When the SGSN 201 transmits a session request message and fails to receive a success response over a predetermined time frame, the SGSN 201 randomly selects the GGSN3 210-3 to transmit a session request message, and when the GGSN3 210-3 is able to process the session of the corresponding IP, the GGSN3 210-3 transmits a success response message to the SGSN 201 in step S604 to set a session.

In the case of using the static IP as described above, the session setting is performed until the SGSN 201 receives a success response message to the session request message.

As described, in order to solve the conventional problem for configuring a GGSN for each specific public network, the GPRS system having multiple GGSNs and a GGSN selecting method according to the present invention configures a plurality of sub-GGSNs, distributes the same, and enables a traffic parallel process to be tolerant of faults and flexible to varying traffic, thereby increasing performance of the GPRS system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A GPRS (general packet radio service) system having multiple GGSNs (gateway GPRS supporting nodes,) connected to a public network, for providing a packet-based mobile service, comprising:

an SGSN (serving GPRS supporting node) for controlling a connection operation according to a session request of a mobile terminal for receiving the packet-based mobile service, and transmitting a packet according to a connected session;

a multiple GGSN unit including a plurality of sub GGSNs, selected by the SGSN according to a session request by the mobile terminal, for performing a gateway operation between the GPRS system and a public network so as to transmit and receive packets, the multiple GGSN unit managing a range of IP (Internet protocol) addresses including a plurality of non-overlapping partitions of the IP addresses, each partition managed by one of the sub GGSNs predetermined to manage the partition;

a DNS (domain name system) for storing DNS names and IP (Internet protocol) information in the sub GGSNs of the multiple GGSN unit according to selection of the SGSN, and managing the same;

an operator network connected between the multiple GGSN unit and the public network, for managing the DNS and communication; and an edge router provided at the final end point of the GPRS system, for performing packet routing between the GPRS system and the public network.

2. The system of claim 1, wherein each sub GGSN in the multiple GGSN unit manages address areas of a static IP and a dynamic IP.

3. The system of claim 1, wherein the edge router has a routing information table according to address areas of a dynamic IP and a static IP allocated to the sub GGSN of the multiple GGSN unit, and uses the routing table to route the packet received from the public network to the corresponding sub GGSN.

4. A method for selecting a GGSN (gateway GPRS supporting node) using a dynamic IP in a GPRS (general packet radio service) system including an SGSN (serving GPRS supporting node) for controlling a connection operation according to a session request of a mobile terminal for receiving the packet-based mobile service; a multiple GGSN unit including a plurality of GGSNs, selected by the SGSN according to a session request by the mobile terminal, for transmitting and receiving packets; and a DNS (domain name system) for storing DNS names and IP (Internet protocol) information in the GGSNs of the multiple GGSN unit according to selection of the SGSN, comprising:

(a0) the multiple GGSN unit managing a range of the dynamic IP including a plurality of non-overlapping partitions of the dynamic IP, each partition managed by one of the GGSNs predetermined to manage the partition;

(a) the SGSN receiving a session connection request provided by the mobile terminal, and enquiring for a GGSN IP address using the DNS name;

(b) the DNS checking that the GGSN IP address enquiry from the SGSN has been received by the DNS name, and notifying the SGSN of IP addresses of all the GGSNs having the corresponding DNS name; and (c) the SGSN randomly selecting one of the GGSNs from among the IP addresses of the GGSNs received from the DNS, and transmitting a session connection request message to connect a session, and providing a packet-based mobile service to the mobile terminal.

5. A method for selecting a GGSN (gateway GPRS supporting node) using a static IP in a GPRS (general packet radio service) system including an SGSN (serving GPRS supporting node) for controlling a connection operation according to a session request of a mobile terminal for receiving the packet-based mobile service, a multiple GGSN unit including a plurality of GGSNs that are selected by the SGSN according to a session request by the mobile terminal, for transmitting and receiving packets, and a DNS (domain name system) for storing DNS names and IP (Internet protocol) information in the GGSNs of the multiple GGSN unit according to selection of the SGSN, comprising:

(a0) the multiple GGSN unit managing a range of the static IP including a plurality of non-overlapping partitions of the static IP, each partition managed by one of the GGSNs predetermined to manage the partition;

(a) the SGSN receiving a session connection request from the mobile terminal, and enquiring for a GGSN P address using the DNS name;

(b) the DNS checking that the GGSN IP address enquiry from the SGSN has been received by the DNS name, and notifying the SGSN of IP addresses of all the GGSNs having the corresponding DNS name;

(c) the SGSN randomly selecting one of the GGSNs from among the IP addresses of the GGSNs received from the DNS, and transmitting a session connection request message to stand by for receipt of a success response message;

(d) the SGSN removing the GGSN selected in (c) if the session connection request message relates to the partitions not managed by the GGSN, randomly selecting another GGSN, and transmitting a session connection request message to it to repeat (c) until the success response message is received, when the SGSN has not received the success response message; and (e) the SGSN connecting a session with the GGSN that has transmitted a success response message to the SGSN, and providing a packet-based mobile service.

* * * * *